United States Patent [19]

Takizawa

[11] Patent Number: 4,945,636
[45] Date of Patent: Aug. 7, 1990

[54] COAXIAL CABLE STRIPPER
[75] Inventor: Takeshi Takizawa, Tokyo, Japan
[73] Assignee: Canare Electric Co., Ltd., Aichi, Japan
[21] Appl. No.: 295,915
[22] Filed: Jan. 11, 1989
[51] Int. Cl.$^5$ .............................................. H02G 1/12
[52] U.S. Cl. ...................... 30/91.2; 30/90.1; 81/9.4
[58] Field of Search ................ 30/90.1, 90.2, 90.3, 30/90.6, 90.7, 90.8, 90.9, 91.1, 91.2; 81/9.4, 9.41, 9.42, 9.43, 9.44

[56] References Cited

U.S. PATENT DOCUMENTS

| | | | |
|---|---|---|---|
| 1,685,977 | 10/1928 | Bollerman | 30/91.2 |
| 2,894,424 | 7/1959 | Vaughan, Jr. | 30/91.2 |
| 3,914,864 | 10/1975 | Prince | 30/90.6 |
| 4,108,028 | 8/1978 | Perrino | 30/90.1 |
| 4,179,956 | 12/1979 | Gooley | 30/90.8 |
| 4,451,948 | 6/1984 | Goodrich et al. | 30/91.2 |
| 4,730,391 | 3/1988 | Wood | 30/90.1 |

Primary Examiner—Frank T. Yost
Assistant Examiner—Rinaldi Rada
Attorney, Agent, or Firm—Koda & Androlia

[57] ABSTRACT

A coaxial cable stripper for removing a part of the covering layers at the end of a coaxial cable including a plurality of rotatable circular blades for cutting into the covering layers of a coaxial cable, a cable-holder which holds the cable therein and a spring which presses the circular blades against the coaxial cable held in the cable-holder so that pressure cutting of the covering layer can be accomplished by rolling the circular blades around the circumference of the coaxial cable.

1 Claim, 3 Drawing Sheets

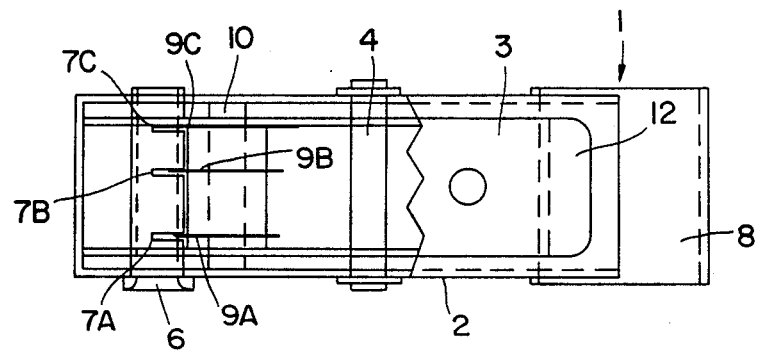
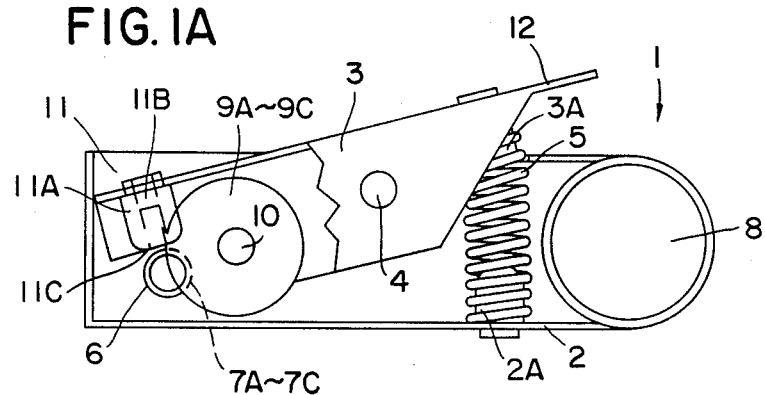
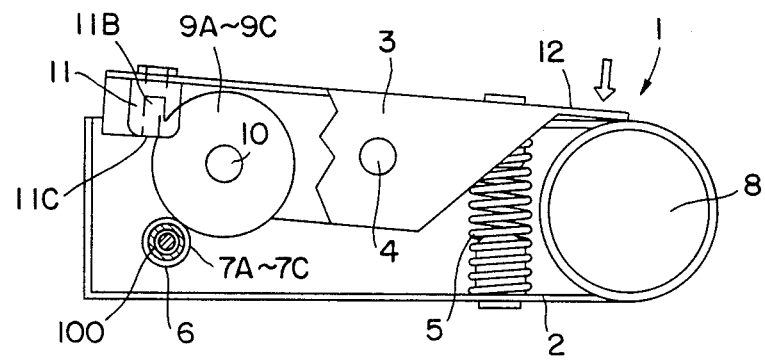

COAXIAL CABLE STRIPPER

BACKGROUND OF THE INVENTION

1. Field of the Invention

The present invention relates to a coaxial cable stripper and more particularly to a coaxial cable stripper which is used to remove a specified length of covering from the end of a coaxial cable so that the cable can be connected to some other device.

2. Prior Art

Conventionally, when a coaxial cable is connected to electrical equipment and/or parts, as seen in FIGS. 4(A) and 4(B), the end of the cable 100 is stripped so that the covering 100A is exposed.

FIGS. 5(A) and (B) illustrate the operating principle of one example of a conventional coaxial stripper. The stripper 101 shown in this example has a cable-holding part which consists of a male part 102 and a female part 103 that interlock with each other. Reference numeral 102A is the cable holding portion of the male part 102, and 103A is the cable-holding portion of the female part 103. A blade 102B is used to cut the covering of the coaxial cable 100 and is attached to the male part 102. Another blade 103B is attached to the female part 103.

In the above-described stripper 101, opposing force is applied to both the male part 102 and the female part 103 in the directions indicated by arrows "A" in FIG. 5(A). As a result, the cable 100 is clamped between the two cable-holding portions 102A and 103A with the cable-holding portions 102A and 103A overlapping as seen in FIG. 5(B). Accordingly, since the two blades 102B and 103B bite into the covering 100A of the cable 100, a cut is formed between the portion of the covering 100A that is to be removed and the portion of the covering that is to be left intact when the stripper 101 is rotated about the cable 100 in the direction indicated by the arrow "B".

Afterward, the tip portion of the covering 100A can be pulled off and removed by moving the stripper 101 toward the end of the cable with the cable 100 being held in the stripper as before.

Step-stripping can also be performed on a cable having a plurality of covering layers so that the layers are removed in a series of steps. Such step-stripping is done using strippers having cable-holding portions 102A and 103A with different diameters and depths and by varying the relative positions of the blades 102A and 103A. Thus, stripping is repeated successively by changing the cutting positions each time.

FIGS. 6(A) and 6(B) show another conventional stripper. Reference numeral 201 is a stripper, and reference numeral 202 is the main body thereof. A moving part 203 is combined with the main body 202 and moves in the direction indicated by the arrow "C". Reference numerals 202A and 203A are cable-holding portions. In this stripper, blades 202B are attached to the main body 202 only. The blades 202B (only one is shown in the Figure) consist of multiple blades which are positioned coaxially with respect to the cable 100, with a predetermined length of space between the blades.

The blades 202B are designed such that the amount by which the edges of the blades project into the cable-holding portion 202A is different for each blade. Accordingly, when the cable 100 is held between the main body 202 and the moving part 203 as shown in FIG. 6(B), the depth to which each blade cuts into the cable is different with the cutting depth increasing toward the edge of the cable 100.

The above described stripper 201 functions as follows: First, the cable holding part 202A of the main body 202 is positioning so as to cut the end of the cable 100. Then, force in the direction of the arrow "C" is applied to the moving part 203. Thus, a cut is made on the covering 100A of the cable 100 by the blades 202B as shown in FIG. 6(B). Then, the stripper 201 is rotated in the direction of the arrow "D". After rotating the stripper, the cut portion of the cable is pulled from the cable 100.

However, in such conventional coaxial cable strippers, "pull cutting" is always performed at the same location with each blade. As a result, stress is concentrated on the edge of each blade and chipping (i.e., blade nicking), tends to occur. Furthermore, since the thickness of the covering layers of cables tend to vary slightly, it is difficult to adjust the depths of the cuts. In addition, since the cable is clamped between the cable-holding portions of two different parts, there would be some discrepancy in the cutting depending on how firmly the cable is held.

In addition, the stripper shown in FIGS. 5(A) and 5(B) cannot cut the end of a multi-layer covering into steps at a plurality of places at the same time. Accordingly, specified lengths that are to be cut from the respective layers must be adjusted along the length of the cable for each cut and this is very time and labor consuming.

SUMMARY OF THE INVENTION

In view of the above disadvantages found in prior art strippers, it is general object of the present invention to provide a coaxial cable stripper which solves the above described problems.

It is another object of the present invention to provide a coaxial cable stripper which makes it possible to cut the covering layers at the ends of coaxial cables accurately and reliably without causing chipping of the blade (blade nicking).

The abovementioned objects of the present invention are achieved by a unique structure of a coaxial cable stripper wherein the coaxial cable stripper has blades for forming cuts in the covering layers of a coaxial cable along the circumferential direction of the coaxial cable. The stripper of the present invention makes it possible to remove the covering layers along the cuts formed by the blades. The cable stripper is equipped with rotatable circular blades, a cable-holding part which holds the coaxial cable, and a means for pressing the circular blades against the coaxial cable held by the cable-holding part so that pressure cutting can be accomplished by rolling the circular blades along the circumference of the coaxial cable.

In the stripper of the present invention, the depths to which the edges of the blades are inserted into the cableholding part via slits are first adjusted to predetermined levels by a cutting depth adjusting means. Then, the coaxial cable is inserted in the cable-holding part. With the edges of the circular blades kept (via a pressing means) in a state such that they cut into the covering of the cable, pressure cutting is accomplished by rolling the circular blades around the circumference of the cable. Accordingly, blade nicking and wear seen in conventional devices does not occur using the entire edge of the blades of this invention uniformly.

BRIEF DESCRIPTION OF THE DRAWINGS

FIGS. 1(A), 1(B) and 1(C) are, respectively, a partially cut-away side view, a partially cut-away plan view and a partially cut-away exploded oblique view of one example of the structure of the coaxial cable stripper of the present invention;

FIG. 2. is a partially cut-away side view which shows a cable inserted into the stripper of the present invention;

DETAILED DESCRIPTION OF THE INVENTION

An embodiment of the present invention will be described with reference to the attached drawings.

Figure 1C:
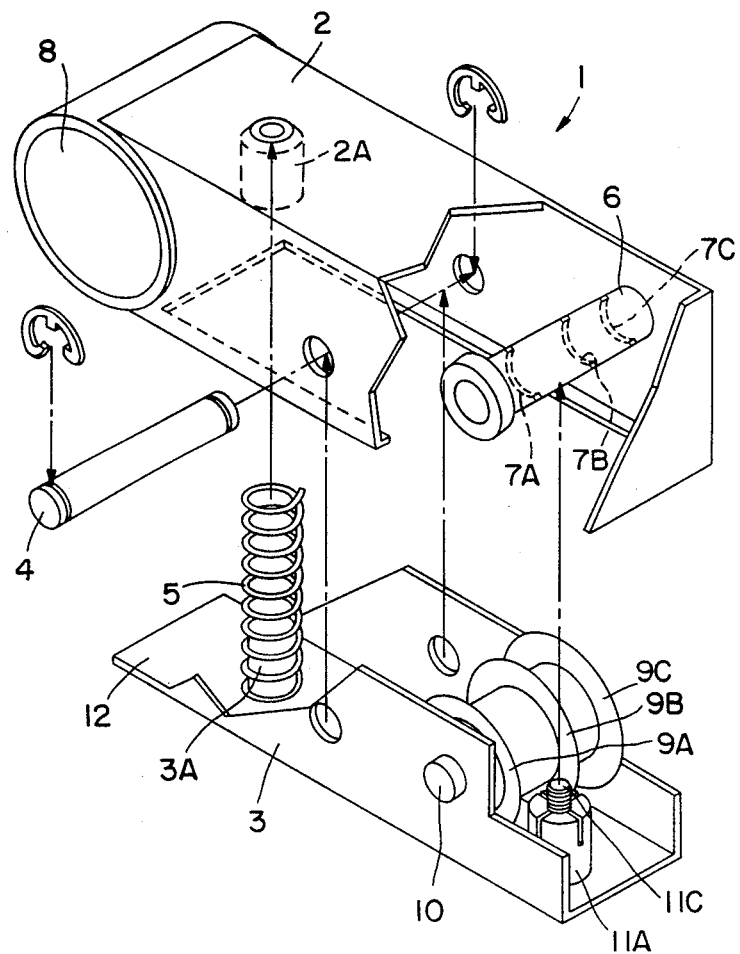

In FIGS. 1(A), 1(B) and 1(C), reference numeral 1 indicates a stripper, and reference references 2 and 3, respectively, indicate a main part (or main casing) and a moving part (or moving casing) which make up the stripper 1. A supporting pin 4 supports the moving part 3 so that the moving part 3 is free to pivot with respect to the main part 2.

A compression spring 5 is mounted between a projection 2A of the main part 2 and a projection 3A of the moving part 3. A cable-holding tube 6 is installed so that it laterally passes through the main part 2. A plurality of (three in this embodiment) slits 7A through 7C are provided in the cable-holding tube 6 as shown in FIGS. 1(B) and 1(C). An operating hole 8 is provided at one end of the main part 2. This operating hole 8 is designed so that cutting of the cable covering layer (described below) can be performed while a finger is inserted in this hole 8.

Circular blades 9A, 9B and 9C are provided in the moving part 3 so that they are free to rotate about a supporting shaft 10. The number of blades corresponds to the number of slits of the cable holding tube 6, and in this embodiment three blades are provided. These circular blades have different diameters and are positioned so that they are separated from each other a predetermined distance. The edges of the blades 9A through 9C are maintained so that they are inserted into the slits 7A through 7C, which are positioned so as to correspond (as shown in FIG. 1(B)).

A blade edge adjusting mechanism 11 is provided in the moving part 3. This mechanism includes a boss 11A, which has a threaded hole and is fixed to the moving part 3, and an adjustment screw 11B which is screwed into the threaded hole of the boss 11A. When this adjustment screw 11B is rotated via a screwing motion, the screw 11B projects from or retracts into the boss 11A. Thus, the height of the screw can be adjusted freely. As a result of turning of the screw 11B, the tip 11C of the adjustment screw 11B contacts the circumference of the cableholding tube 6, and in this way, the depth to which the cable covering 100A is cut by the circular blades 9A through 9C can be adjusted.

A manipulating part 12 is formed at one end of the moving part 3.

As shown in FIG. 1A, the compression spring 5 provides pressing force to the moving part 3 in a counterclockwise direction so that the moving part 3 is pivoted about the supporting pin 4 and the tip 11C of the adjustment screw 11B is kept in contact with the circumference of the cableholding tube 6.

When the end of a cable 100 is to be treated, the depth to which the circular blades 9A through 9C are inserted into the cable-holding tube 6 via the slits 7A through 7C are first adjusted by means of the blade edge adjusting mechanism 11. The manipulating part 12 is then pushed down manually so that the edges of the respective circular blades 9A through 9C are withdrawn from inside of the cable-holding tube 6 as shown in FIG. 2. Next, the cable 100 is inserted into the cable-holding tube 6 and positioned in a predetermined position for cutting.

Figure 3A:
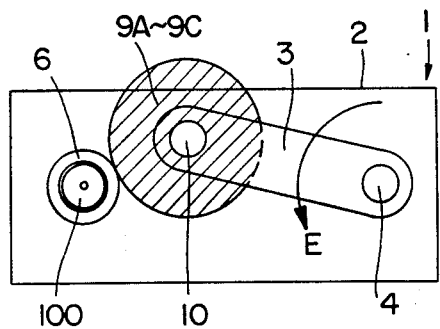
FIGS. 3(A) and 3(B) are explanatory diagrams which illustrate the principle of the cutting operation performed by the stripper of the present invention.
Figure 3B:
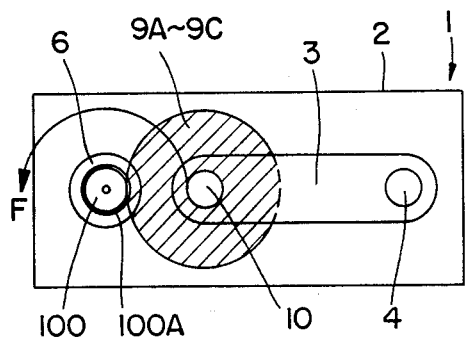
Figure 4A:
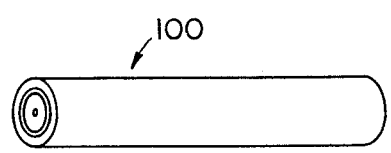
FIGS. 4(A) and 4(B) illustrate configurations of a coaxial cable.
Figure 4B:
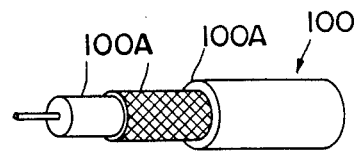
Figure 5A:
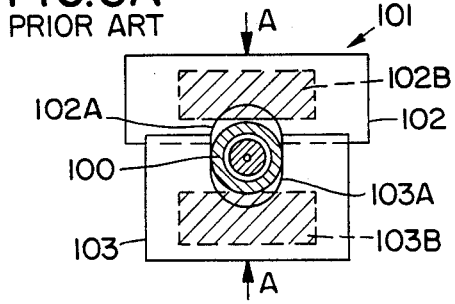
FIGS. 5(A) and (B) are explanatory diagrams which illustrate the structure and operating principle of an example of a conventional coaxial cable stripper.
Figure 5B:
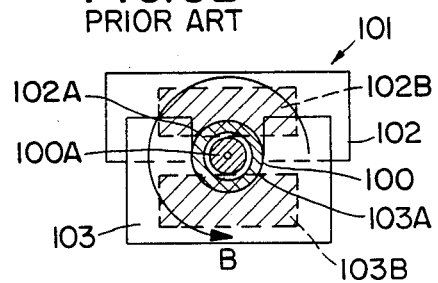
Figure 6A:
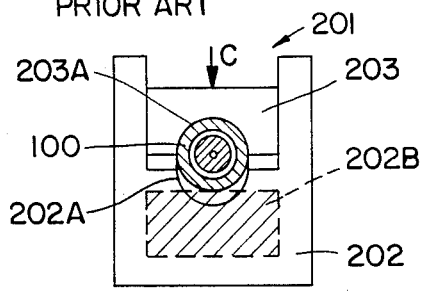
FIGS. 6(A) and 6(B) are explanatory diagrams which illustrate the structure and operating principle of another example of a conventional coaxial cable stripper.
Figure 6B:
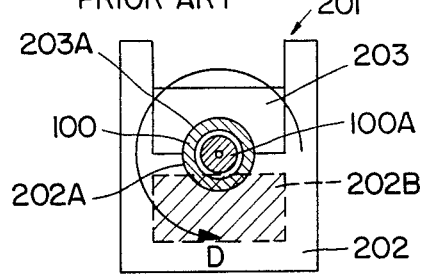

The operating principle of the subsequent cable end treatment is illustrated in FIGS. 3(A) and 3(B).

Specifically, FIG. 3(A) is an explanatory diagram which corresponds to FIG. 2. When a finger is removed from the manipulating part 12, the moving part 3 is caused to rotate in the direction indicated by the arrow "E" as a result of the spring force of the compression spring 5. Thus, the stripper is in the state illustrated in FIG. 3(A). After the circular blades 9A through 9C have made contact with the circumference of the cable 100, the blades rotate in connection with the above described rotation of the moving part 3, so that the blades bite into the cable covering 100A with cutting pressure thereon, thus producing the state illustrated in FIG. 3(B).

With the cable 100 firmly held in the stripper 1, the stripper 1 as a whole is rotated about the cable 100 in the direction indicated by the arrow "F". As a result, cuts of different depths are made at three different points separated by predetermined distances. Therefore, it is only necessary to merely pull the cable 100 from the cable-holding tube 6 or to remove the covering 100A, into which the cuts have been made. manually after the stripper is brought to the state shown in FIG. 3A and retracting cable 100.

As described above, the stripper of the present invention includes rotatable circular blades, a cable-holding part holding a coaxial cable and having slits formed in the circumferential direction at predetermined positions, and a pressing means which causes the tips of the circular blades to cut into the coaxial cable inserted into the cable-holding part via the slits. Thus, cuts are made in the covering of the coaxial cable by pressure-cutting as a result of the circular blades being rolled along the circumference of the coaxial cable held in the cable-holding part with the edges of the circular blades cutting into the coaxial cable. Accordingly, the whole edge of each circular blade is used in pressure cutting so that blade chipping and blade wear can be suppressed. In addition, the cable can be held in a predetermined position more securely by the cable-holding part and pressing means, and cutting depths requiring the high precision can be freely adjusted. Thus, cutting depth can be adjusted in accordance with the thickness of the covering when there is variation according to the make of the cable.

In the above embodiment, a stripper is described in which three cuts are made in the cable covering; however, it goes without saying that the number of cuts is not limited to three as described.

I claim:

1. A coaxial cable stripper comprising:

a main casing and a moving casing which are pivotally connected by a supporting pin;

a spring provided between said main casing and moving casing so that said spring urges one end of said main casing and an opposing end of said moving casing in opposite directions;

a plurality of circular blades rotatably mounted at another end of said moving casing, each of said plurality of blades being of a different diameter and separated from each other by a predetermined distance;

a cylindrical cable holder provided in said main casing, a plurality of slits provided in said cable holder, each of said plurality of slits corresponding to one of said plurality of blades so that each of said plurality of blades enter a corresponding one of said plurality of slits by a spring force of said spring; and a blade adjusting means for setting an amount each of said blades extends into said slits provided at said another end of said moving casing, said adjusting means comprising a boss and adjustment screw so that said adjustment screw can be screwed into and out of said boss and contact with said cable holder whereby a depth to which said coaxial cable is cut by said plurality of blades is adjusted.

* * * * *